(12) United States Patent
Qi et al.

(10) Patent No.: US 9,395,589 B2
(45) Date of Patent: Jul. 19, 2016

(54) ELECTRONIC DEVICE WITH INVERTED LIQUID CRYSTAL DISPLAY

(75) Inventors: Jun Qi, Cupertino, CA (US); Dinesh C. Mathew, Fremont, CA (US); Bryan W. Posner, La Selva Beach, CA (US); Keith J. Hendren, Capitola, CA (US); Peteris K. Augenbergs, San Francisco, CA (US); Adam T. Garelli, Santa Clara, CA (US); Victor H. Yin, Cupertino, CA (US); Thomas W. Wilson, Jr., Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/424,950

(22) Filed: Mar. 20, 2012

(65) Prior Publication Data

US 2013/0250202 A1   Sep. 26, 2013

(51) Int. Cl.
*G02F 1/1335* (2006.01)
*G02F 1/1362* (2006.01)

(52) U.S. Cl.
CPC ........ *G02F 1/1362* (2013.01); *G02F 1/133512* (2013.01); *G02F 2001/133562* (2013.01); *G02F 2001/136222* (2013.01)

(58) Field of Classification Search
CPC ............ G02F 1/133512; G02F 1/1362; G02F 2001/133562; G02F 2001/136222
See application file for complete search history.

(56) References Cited

U.S. PATENT DOCUMENTS

| | | |
|---|---|---|
| 5,965,916 A | 10/1999 | Chen |
| 6,008,872 A | 12/1999 | den Boer et al. |
| 6,424,397 B1 | 7/2002 | Kuo |
| 6,452,657 B1 | 9/2002 | Suzuki et al. |
| 7,075,610 B2 | 7/2006 | Scalora et al. |
| 7,196,758 B2 | 3/2007 | Crawford et al. |

(Continued)

FOREIGN PATENT DOCUMENTS

| | | |
|---|---|---|
| CN | 1683967 | 10/2005 |
| CN | 101226313 | 7/2008 |

(Continued)

OTHER PUBLICATIONS

Invitation to Pay Additional Fees dated May 14, 2013, PCT/US2013/031076, 5 pages.

(Continued)

*Primary Examiner* — Ryan Crockett
(74) *Attorney, Agent, or Firm* — Treyz Law Group, P.C.; G. Victor Treyz; Zachary D. Hadd

(57) ABSTRACT

An electronic device may have a liquid crystal display with backlight structures. The backlight structures may produce backlight that passes through an array of display pixels. The display pixels may include electrode structures and thin-film transistor structures for controlling electric fields in a layer of liquid crystal material. The liquid crystal material may be formed between an outer display layer and an inner display layer. The inner display layer may be interposed between the backlight structures and the liquid crystal material. Thin-film transistor structures, electrodes, and conductive interconnection lines may be deposited in a layer on the inner surface of the outer display layer. A layer of color filter elements may be used to provide the display with color pixels. The color filter elements may be formed on top of the thin-film transistor layer or on a separate color filter array substrate such as the inner display layer.

20 Claims, 15 Drawing Sheets

(56) References Cited

U.S. PATENT DOCUMENTS

| | | |
|---|---|---|
| 7,319,501 B2 | 1/2008 | Takeda et al. |
| 7,920,238 B2 | 4/2011 | Kajita et al. |
| 8,259,279 B2 | 9/2012 | Shoraku et al. |
| 2003/0020851 A1 | 1/2003 | Kim et al. |
| 2003/0223021 A1 | 12/2003 | Kaneko et al. |
| 2004/0046908 A1* | 3/2004 | Shih et al. ............ 349/113 |
| 2004/0135944 A1* | 7/2004 | Kim ............... 349/113 |
| 2004/0141117 A1 | 7/2004 | Tashiro et al. |
| 2004/0141127 A1 | 7/2004 | Tsai et al. |
| 2005/0179840 A1* | 8/2005 | Park et al. ............ 349/114 |
| 2006/0007372 A1 | 1/2006 | Yuuki et al. |
| 2006/0181659 A1 | 8/2006 | Kawashima et al. |
| 2007/0153171 A1 | 7/2007 | Kim |
| 2007/0171337 A1* | 7/2007 | Kim et al. ............ 349/110 |
| 2007/0195235 A1* | 8/2007 | Chang et al. ............ 349/114 |
| 2008/0088550 A1 | 4/2008 | Kim et al. |
| 2008/0100565 A1 | 5/2008 | Song et al. |
| 2008/0170168 A1* | 7/2008 | Jung et al. ............ 349/47 |
| 2009/0059126 A1 | 3/2009 | Koganezawa |
| 2009/0128753 A1 | 5/2009 | Shi |
| 2009/0189847 A1 | 7/2009 | Hughes et al. |
| 2009/0237583 A1* | 9/2009 | Chol ............... 349/58 |
| 2010/0053514 A1 | 3/2010 | Chuang |
| 2010/0079698 A1* | 4/2010 | Matsumoto et al. ............ 349/58 |
| 2011/0194056 A1* | 8/2011 | Kim ............... 349/114 |
| 2011/0210094 A1 | 9/2011 | Gray et al. |
| 2011/0304791 A1 | 12/2011 | Takahashi et al. |
| 2013/0250202 A1 | 9/2013 | Qi et al. |
| 2014/0085556 A1 | 3/2014 | Yin et al. |

FOREIGN PATENT DOCUMENTS

| | | |
|---|---|---|
| CN | 101539683 | 9/2009 |
| EP | 1826603 | 8/2007 |
| JP | 2008-020772 | 1/2008 |
| JP | 2011-170134 | 9/2011 |
| KR | 10-2005-0072388 | 7/2005 |
| KR | 10-2006-0038148 | 5/2006 |
| KR | 10-2007-0072299 | 7/2007 |
| KR | 10-2007-0120672 | 12/2007 |
| TW | 200412463 | 7/2004 |

OTHER PUBLICATIONS

International Search Report dated Jul. 10, 2013, PCT/US2013/031076, 15 pages.

German Office Action dated Nov. 5, 2014, DE 112013001588.9, 11 pages.

\* cited by examiner

ELECTRONIC DEVICE WITH INVERTED LIQUID CRYSTAL DISPLAY

BACKGROUND

This relates generally to electronic devices and, more particularly, to displays for electronic devices.

Electronic devices such as computers and cellular telephones are generally provided with displays. Displays such as liquid crystal displays contain a thin layer of liquid crystal material. Color liquid crystal displays include color filter layers. The layer of liquid crystal material in this type of display is interposed between the color filter layer and a thin-film transistor. Polarizer layers may be placed above and below the color filter layer, liquid crystal material, and thin-film transistor layer.

When it is desired to display an image for a user, display driver circuitry applies signals to a grid of data lines and gate lines within the thin-film transistor layer. These signals adjust electric fields associated with an array of pixels on the thin-film transistor layer. The electric field pattern that is produced controls the liquid crystal material and creates a visible image on the display.

Image quality in conventional displays can be degraded during off-axis viewing, because off-axis viewing angles can allow light from display pixels of one color to bleed into adjacent display pixels of another color. Although off-axis quality can be improved somewhat by incorporating wide black matrix structures into the display, the use of excessively large black matrix masking lines can adversely affect display brightness.

It would therefore be desirable to be able to provide improved electronic device displays.

SUMMARY

Electronic devices may be provided with displays such as liquid crystal displays. A display may have an array of display pixels. The display pixels may be controlled using a grid of data lines and gate lines. Each pixel may receive display data on a data line and may have a thin-film transistor that is controlled by a gate line signal on a gate line. The thin-film transistors may be controlled to apply electric fields to a layer of liquid crystal material.

A liquid crystal display may be provided with backlight structures. The backlight structures may produce backlight that passes through an array of display pixels. The display pixels may include electrode structures and thin-film transistor structures for controlling electric fields in the layer of liquid crystal material. The liquid crystal material may be formed between an outer display layer and an inner display layer.

The inner display layer may be interposed between the backlight structures and the liquid crystal material. Thin-film transistor structures, electrodes, and conductive interconnection lines may be deposited in a layer on the inner surface of the outer display layer.

A layer of color filter elements may be used to provide the display with color pixels. With one suitable configuration, the color filter elements may be formed on the thin-film transistor layer. In this type of configuration, the inner display layer may be formed from a layer of clear glass or plastic. In another suitable configuration, the color filter elements may be formed on the inner display layer.

A patterned layer of opaque masking material may be formed in a peripheral border region of the outer display layer. A planarization layer may be used to cover the opaque masking layer. The thin-film transistors and other display pixels structures may be formed on the planarization layer.

Further features of the invention, its nature and various advantages will be more apparent from the accompanying drawings and the following detailed description of the preferred embodiments.

DETAILED DESCRIPTION

Figure 1:
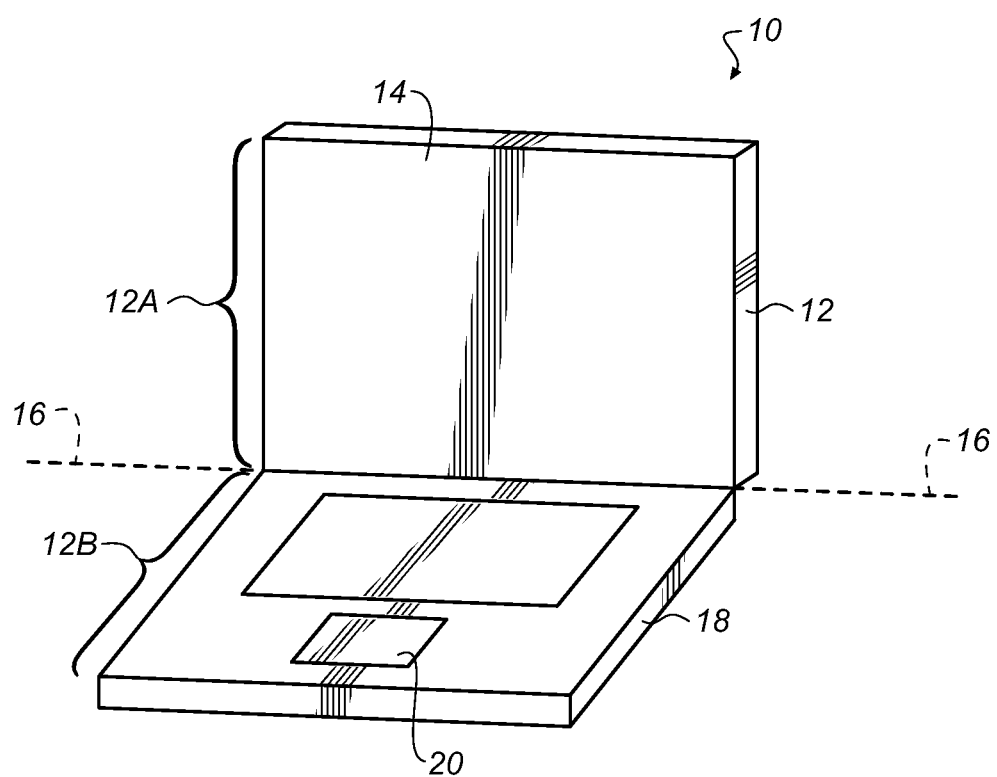
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
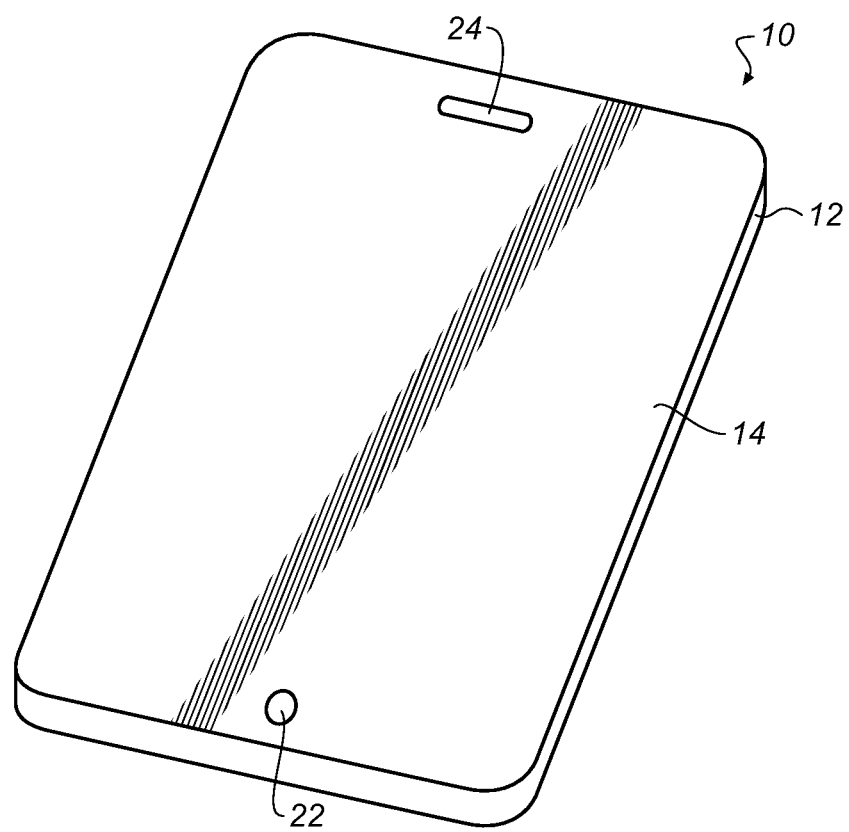
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an active portion and an inactive portion. Display 14 may have openings (e.g., openings in the inactive or active portions of display 14) such as an opening to accommodate button 22 and an opening to accommodate speaker port 24.

Figure 3:
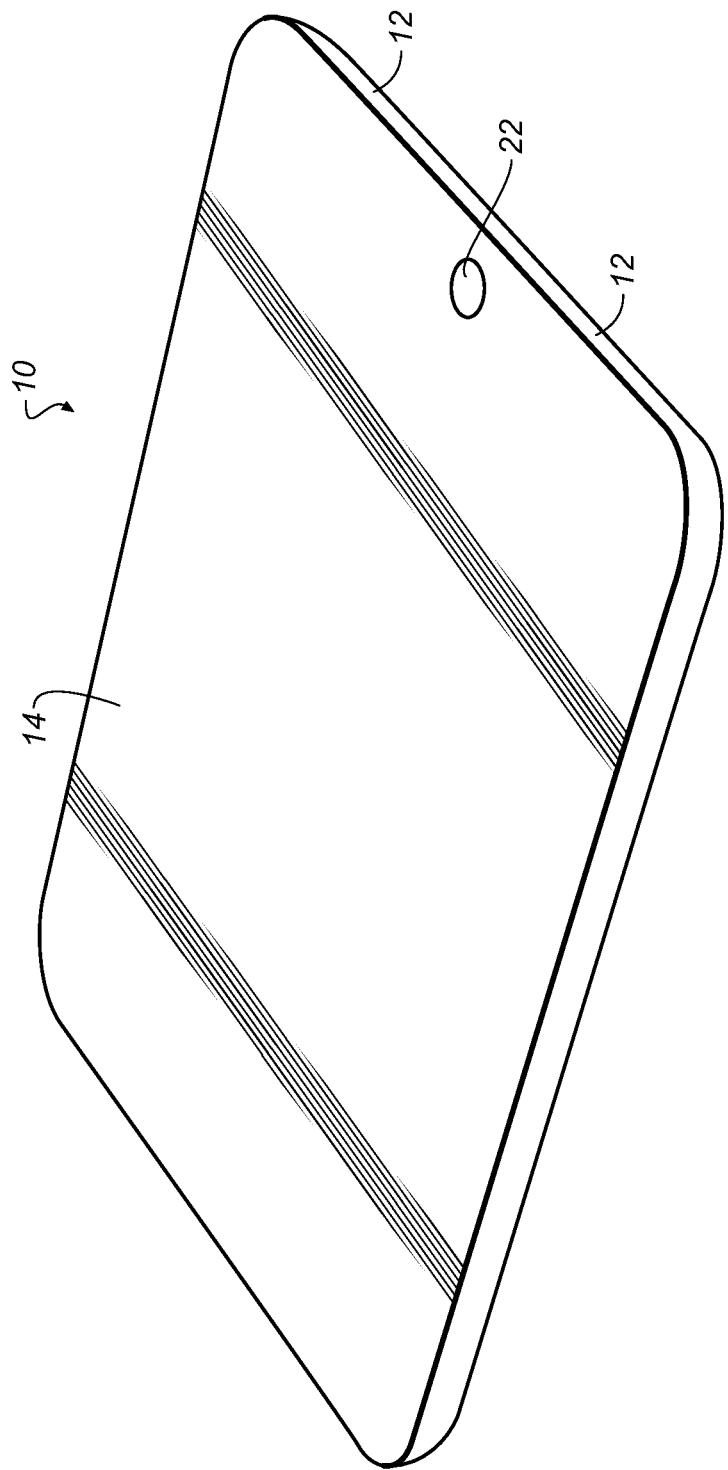
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22.

Figure 4:
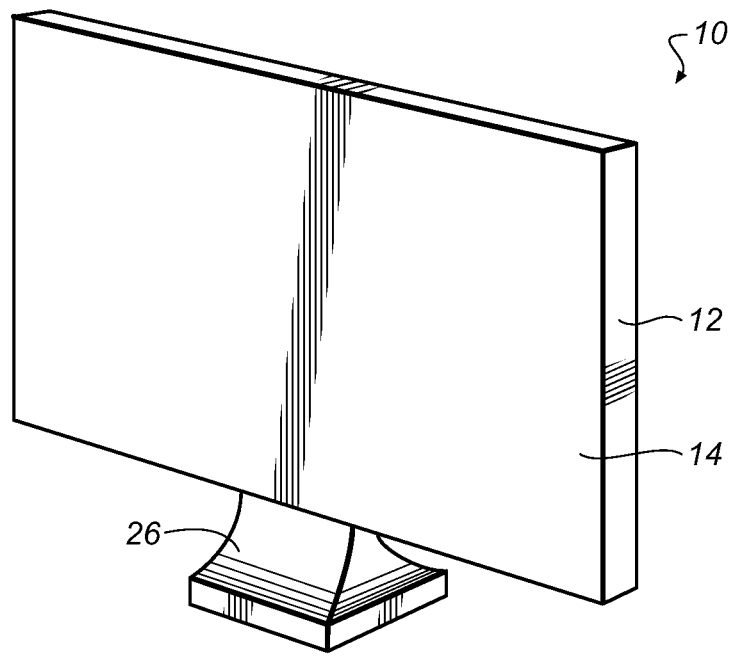
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12.

Other configurations may be used for electronic device 10 if desired. The examples of FIGS. 1, 2, 3, and 4 are merely illustrative.

Figure 5:
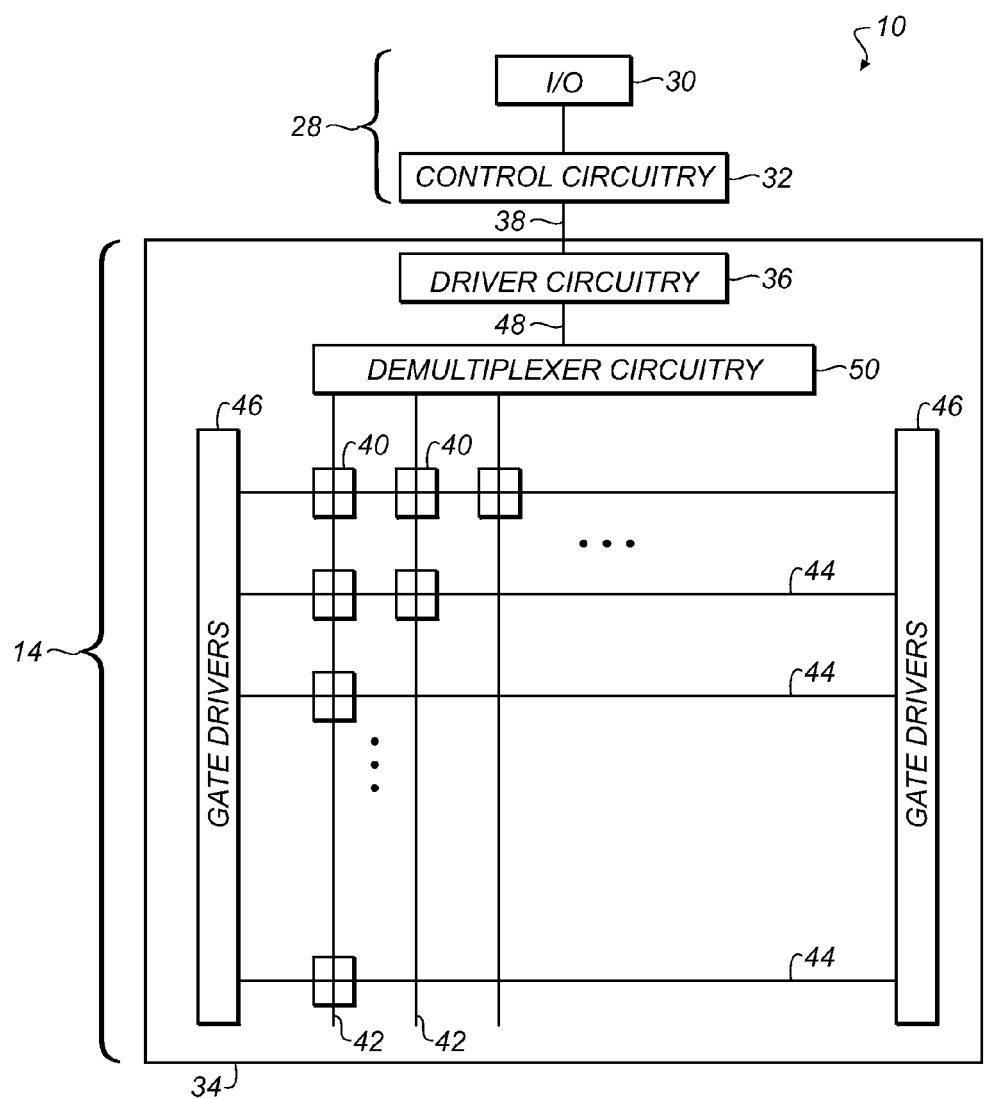
FIG. 5 is a circuit diagram showing circuitry that may be used in operating an electronic device with a display in accordance with an embodiment of the present invention.

A diagram showing circuitry of the type that may be used in device 10 is shown in FIG. 5. As shown in FIG. 5, display 14 may be coupled to device components 28 such as input-output circuitry 30 and control circuitry 32. Input-output circuitry 30 may include components for receiving device input. For example, input-output circuitry 30 may include a microphone for receiving audio input, a keyboard, keypad, or other buttons or switches for receiving input (e.g., key press input or button press input from a user), sensors for gathering input such as an accelerometer, a compass, a light sensor, a proximity sensor, touch sensor (e.g., touch sensors associated with display 14 or separate touch sensors), or other input devices. Input-output circuitry 30 may also include components for supplying output. Output circuitry may include components such as speakers, light-emitting diodes or other light-emitting devices for producing light output, vibrators, and other components for supplying output. Input-output ports in circuitry 30 may be used for receiving analog and/or digital input signal and may be used for outputting analog and/or digital output signals. Examples of input-output ports that may be used in circuitry 30 include audio ports, digital data ports, ports associated with 30-pin connectors, and ports associated with Universal Serial Bus connectors and other digital data connectors.

Control circuitry 32 may be used in controlling the operation of device 10. Control circuitry 32 may include storage circuits such as volatile and non-volatile memory circuits, solid state drives, hard drives, and other memory and storage circuitry. Control circuitry 32 may also include processing circuitry such as processing circuitry in a microprocessor or other processor. One or more integrated circuits may be used in implementing control circuitry 32. Examples of integrated circuits that may be included in control circuitry 32 include microprocessors, digital signal processors, power management units, baseband processors, microcontrollers, application-specific integrated circuits, circuits for handling audio and/or visual information, and other control circuitry.

Control circuitry 32 may be used in running software for device 10. For example, control circuitry 32 may be configured to execute code in connection with the displaying of images on display 14 (e.g., text, pictures, video, etc.).

Display 14 may include a pixel array such as pixel array 34. Pixel array 34 may be controlled using control signals produced by display driver circuitry such as display driver circuitry 36. Display driver circuitry 36 may be implemented using one or more integrated circuits (ICs) and may sometimes be referred to as a driver IC, display driver integrated circuit, or display driver. Display driver integrated circuit 36 may be mounted on an edge of a thin-film transistor substrate layer in display 14 (as an example). The thin-film transistor substrate layer may sometimes be referred to as a thin-film transistor (TFT) layer.

During operation of device 10, control circuitry 32 may provide data to display driver 36. For example, control circuitry 32 may use a path such as path 38 to supply display driver 36 with digital data corresponding to text, graphics, video, or other images to be displayed on display 14. Display driver 36 may convert the data that is received on path 20 into signals for controlling the pixels of pixel array 34.

Pixel array 34 may contain rows and columns of display pixels 40. The circuitry of pixel array 34 may be controlled using signals such as data line signals on data lines 42 and gate line signals on gate lines 44.

Pixels 40 in pixel array 34 may contain thin-film transistor circuitry (e.g., polysilicon transistor circuitry or amorphous silicon transistor circuitry) and associated structures for producing electric fields across liquid crystal material in display 14. The thin-film transistor structures that are used in forming pixels 40 may be located on a substrate (sometimes referred to as a thin-film transistor layer or thin-film transistor substrate). The thin-film transistor (TFT) layer may be formed from a planar glass substrate, a plastic substrate, or a sheet of other suitable substrate materials.

Gate driver circuitry 46 may be used to generate gate signals on gate lines 44. Circuits such as gate driver circuitry 46 may be formed from thin-film transistors on the thin-film transistor layer. Gate driver circuitry 46 may be located on both the left and right sides of pixel array 34 (as shown in FIG. 5) or may be located on only one side of pixel array 34.

The data line signals in pixel array 34 carry analog image data (e.g., voltages with magnitudes representing pixel brightness levels). During the process of displaying images on display 14, display driver integrated circuit 36 may receive digital data from control circuitry 18 via path 38 and may produce corresponding analog data on path 48. The analog data signals on path 48 may be demultiplexed by demultiplexer circuitry 50 in accordance with control signals provided by driver circuitry 36. This demultiplexing process produces corresponding color-coded analog data line signals on data lines 42 (e.g., data signals for a red channel, data signals for a green channel, and data signals for a blue channel).

The data line signals on data lines 42 may be provided to the columns of display pixels 40 in pixel array 34. Gate line signals may be provided to the rows of pixels 40 in pixel array 34 by gate driver circuitry 46.

The circuitry of display 14 such as demultiplexer circuitry 50 and gate driver circuitry 46 and the circuitry of pixels 40 may be formed from conductive structures (e.g., metal lines and/or structures formed from transparent conductive materials such as indium tin oxide) and may include transistors that are fabricated on the thin-film transistor substrate layer of display 14. The thin-film transistors may be, for example, polysilicon thin-film transistors or amorphous silicon transistors.

Figure 6:
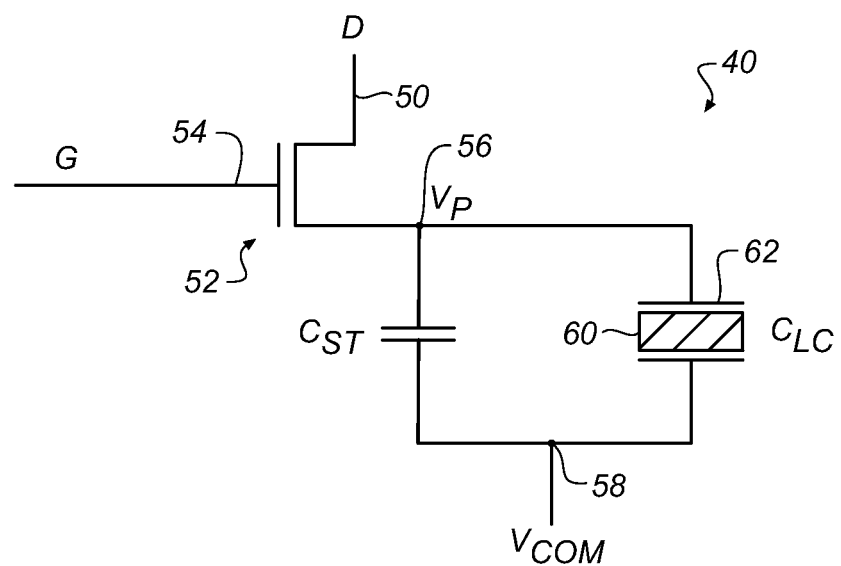
FIG. 6 is a circuit diagram of an illustrative display pixel in accordance with an embodiment of the present invention.

FIG. 6 is a circuit diagram of an illustrative display pixel in pixel array 34. Pixels such as pixel 40 of FIG. 6 may be located at the intersection of each gate line 44 and data line 42 in array 34.

A data signal D may be supplied to terminal 50 from one of data lines 42 (FIG. 5). Thin-film transistor 52 (e.g., a thin-film polysilicon transistor or an amorphous silicon transistor) may have a gate terminal such as gate 54 that receives gate line signal G from gate driver circuitry 46 (FIG. 5). When signal G is asserted, transistor 52 will be turned on and signal D will be passed to node 56 as voltage Vp. Data for display 14 may be displayed in frames. Following assertion of signal G in one frame, signal G may be deasserted. Signal G may then be asserted to turn on transistor 52 and capture a new value of Vp in a subsequent display frame.

Pixel 40 may have a signal storage element such as capacitor Cst or other charge storage element. Storage capacitor Cst may be used to store signal Vp between frames (i.e., in the period of time between the assertion of successive signals G).

Display 14 may have a common electrode coupled to node 58. The common electrode (which is sometimes referred to as the Vcom electrode) may be used to distribute a common electrode voltage such as common electrode voltage Vcom to nodes such as node 58 in each pixel 40 of array 24. Capacitor Cst may be coupled between nodes 56 and 58. A parallel capacitance Clc arises across nodes 56 and 58 due to electrode structures in pixel 40 that are used in controlling the electric field through the liquid crystal material of the pixel (liquid crystal material 60). As shown in FIG. 6, electrode structures 62 may be coupled to node 56. Capacitance Clc is associated with the capacitance between electrode structures 62 and common electrode Vcom at node 58. During operation, electrode structures 62 may be used to apply a controlled electric field (i.e., a field having a magnitude proportional to Vp-Vcom) across a pixel-sized portion of liquid crystal material 60 in pixel 40. Due to the presence of storage capacitor Cst, the value of Vp (and therefore the associated electric field across liquid crystal material 60) may be maintained across nodes 56 and 58 for the duration of the frame.

The electric field that is produced across liquid crystal material 60 causes a change in the orientations of the liquid crystals in liquid crystal material 60. This changes the polarization of light passing through liquid crystal material 60. The change in polarization may be used in controlling the amount of light that is transmitted through each pixel 40 in array 34.

Figure 7:
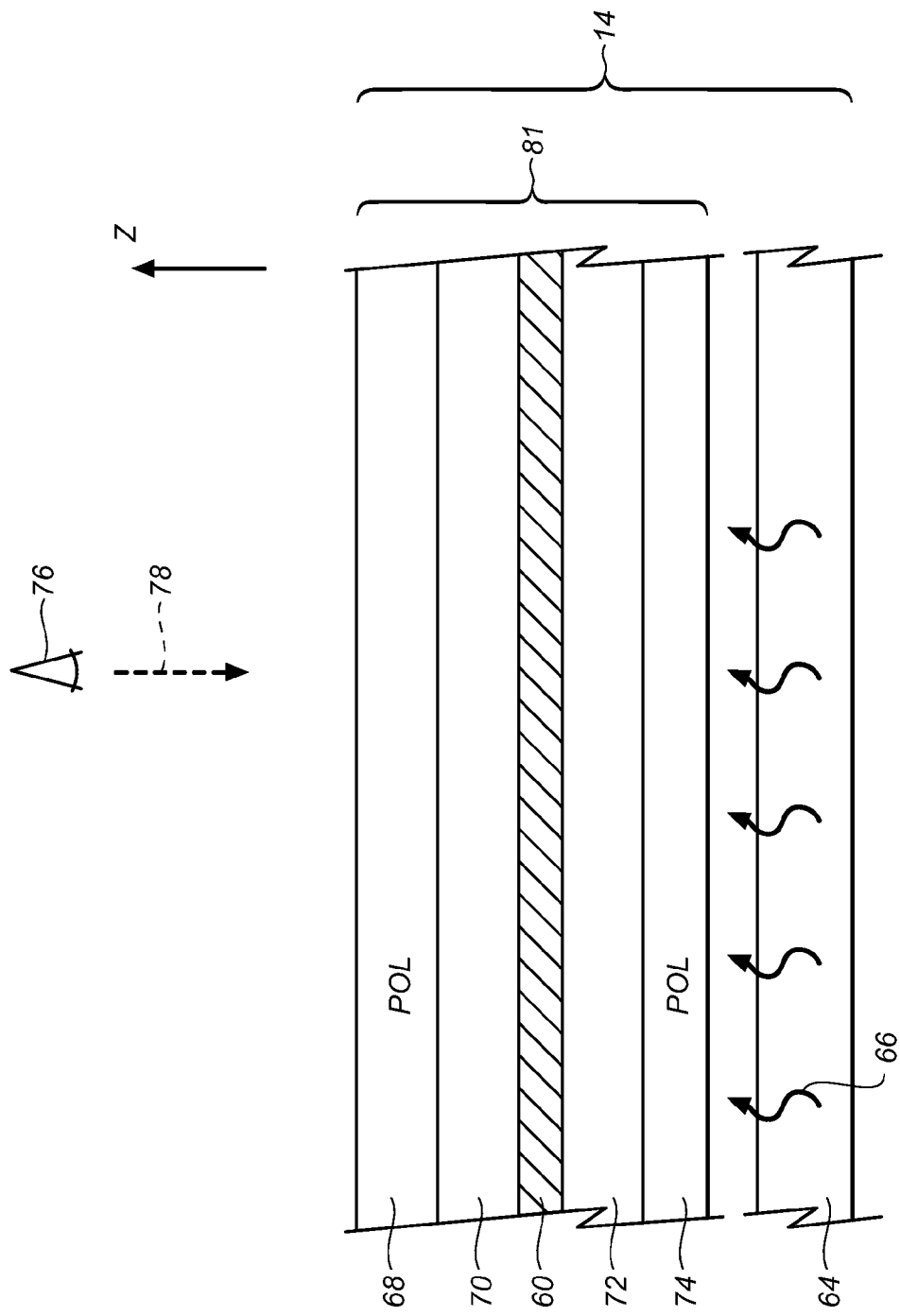
FIG. 7 is a cross-sectional side view of a portion of an illustrative liquid crystal display with backlight structures in accordance with an embodiment of the present invention.

A portion of display 14 illustrating how changes in the light polarization produced by liquid crystal material 60 can be used to affect the amount of light that is transmitted through display 14 is shown in FIG. 7. As shown in FIG. 7, backlight structures 64 may be used to produce backlight 66 that travels upwards (outwards) in dimension Z through display layers 81 of display 14. Display layers 81 may include an upper polarizer layer such as layer 68 and a lower polarizer layer 74. Upper polarizer layer 68 may be attached to one or more substrate layers such as layer 70. Lower polarizer layer 74 may be attached to one or more substrate layers such as layer 72. Layers 70 and/or 72 may be formed from transparent layers such as layers of glass, plastic, or other sheets of material. Layers 70 and/or 72 and other layers of display 81 may include thin-film transistor layers, color filter layers, layers that include thin-film transistor structures and color filter elements, planarization layers, opaque masking patterns, clear layers, or other suitable display layers.

As light 66 passes through lower polarizer 74, lower polarizer 74 polarizes light 66. As polarized light 66 passes through liquid crystal material 60, liquid crystal material 60 may rotate the polarization of light 66 by an amount that is proportional to the electric field through liquid crystal material 60. If the polarization of light 66 is aligned in parallel with the polarization of polarizer 68, the transmission of light 66 through layer 68 will be maximized. If the polarization of light 66 is aligned so as to run perpendicular to the polarization of polarizer 68, the transmission of light 66 through layer 68 will be minimized (i.e., light 66 will be blocked). The display circuitry of FIG. 5 may be used in adjusting the voltages Vp across the electrodes 62 of display pixels 40 in display pixel array 34, thereby selectively lightening and darkening pixels 40 in pixel array 34 and presenting an image to a user of device 10 such as viewer 76, viewing display 14 in direction 78.

Displays such as display 14 may be mounted on one or more surfaces of device 10. For example, displays such as display 14 may be mounted on a front face of housing 12, on a rear face of housing 12, or on other portions of device 10.

Figure 8:
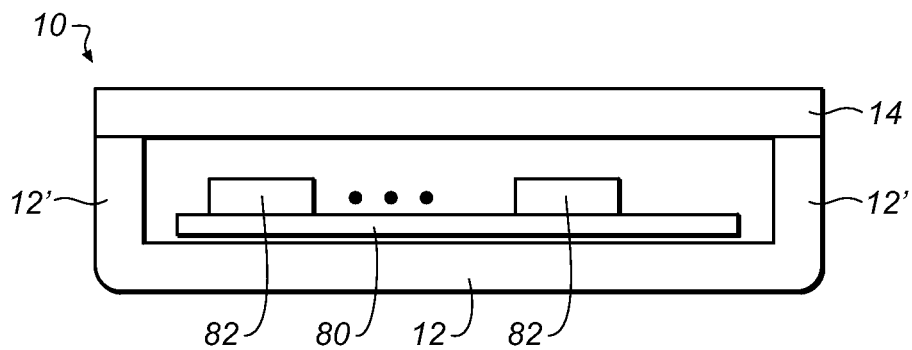
FIG. 8 is a cross-sectional view of an illustrative electronic device having a display that overlaps housing sidewall structures in accordance with an embodiment of the present invention.

As shown in FIG. 8, display 14 may be mounted in housing 12 so that some or all of the edges of display 14 overlap housing sidewalls 12'. Internal electrical components 82 (e.g., input-output components 30, control circuitry 32, etc.) may be mounted on one or more substrates such as substrate 80 within housing 12. Substrate 80 may be formed from one or more printed circuits. For example, substrate 80 may include a rigid printed circuit board (e.g., a printed circuit board formed from a material such as fiberglass-filled epoxy) and/or a flexible printed circuit ("flex circuit") such as a printed circuit formed from patterned conductive traces on a sheet of polyimide or other flexible polymer.

Figure 9:
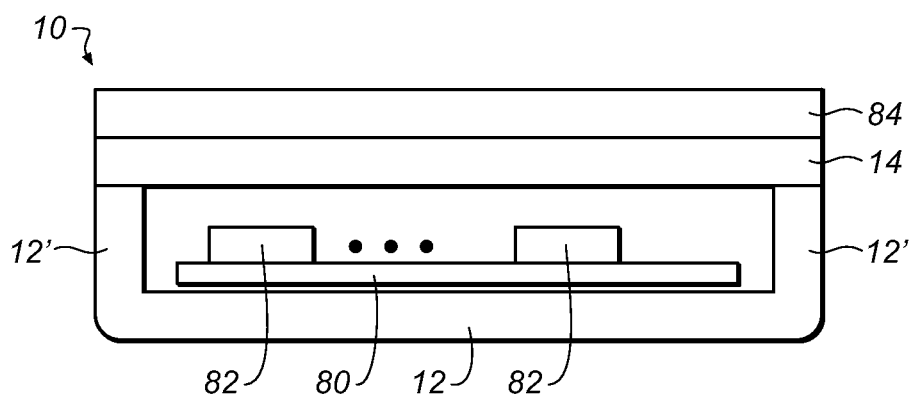
FIG. 9 is a cross-sectional view of an illustrative electronic device having a display that overlaps housing sidewall structures and having a display cover layer in accordance with an embodiment of the present invention.

If desired, some or all of the outermost surface of display 14 may be covered with a display cover layer such as display cover layer 84 of FIG. 9. Display cover layer 84 may be formed from a layer of glass, a layer of plastic, a layer of ceramic, or other suitable transparent materials. One or more additional display layers may also be included in display 14 if desired (e.g., antireflection films, scratch-resistance coating layers, fingerprint-reducing layers, layers that perform multiple functions such as reducing reflection, reducing scratches, and reducing fingerprints, etc.).

Figure 10:
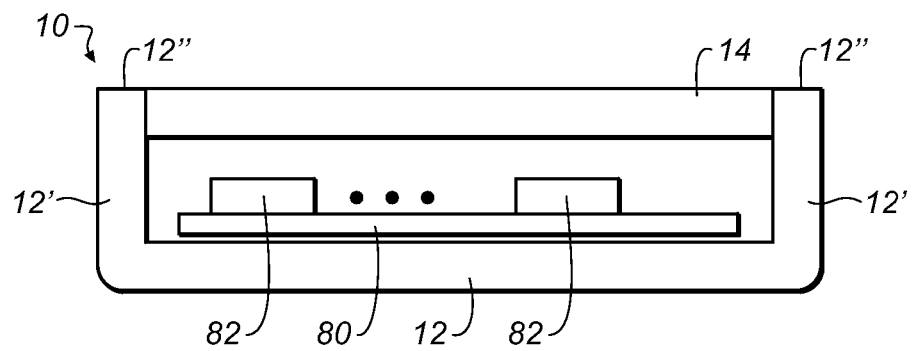
FIG. 10 is a cross-sectional view of an illustrative electronic device having a display with edges that are mounted between opposing housing sidewalls in accordance with an embodiment of the present invention.
Figure 11:
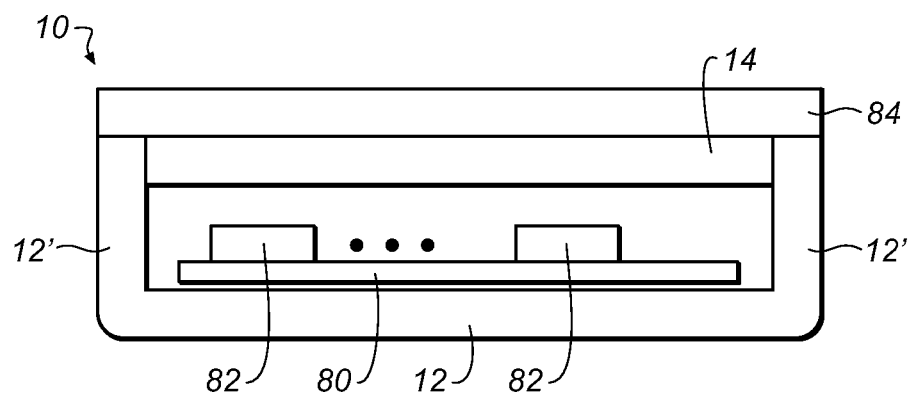
FIG. 11 is a cross-sectional view of an illustrative electronic device having a display with edges that are mounted between opposing housing sidewalls and having a display cover layer in accordance with an embodiment of the present invention.

FIG. 10 is a cross-sectional view of device 10 in a configuration in which display 14 has been mounted between respective housing sidewalls 12' (i.e., without overlapping upper edges 12" of sidewalls 12'). FIG. 11 shows how display cover layer 84 may be used to cover display 14 in a configuration in which display 14 is mounted between housing sidewalls 12'.

The illustrative mounting arrangements of FIGS. 8, 9, 10, and 11 are merely illustrative examples of ways in which display 14 may be mounted in housing 12 of device 10. Other mounting configurations may be used if desired.

Figure 12:
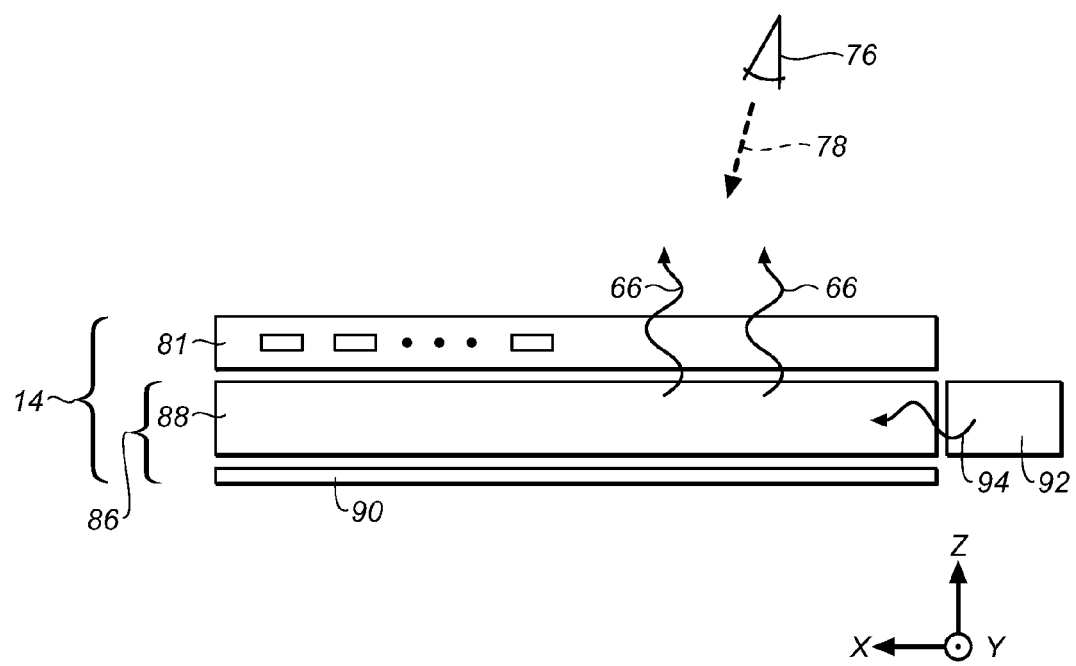
FIG. 12 is a cross-sectional side view of a display showing how backlight structures may be used to provide the display with backlight in accordance with an embodiment of the present invention.

FIG. 12 is a cross-sectional view of display 14 showing how backlight structures 86 may be used in producing backlight 66 for display 14. As shown in FIG. 12, a light source such as light source 92 may produce light 94. Light source 92 may include, for example, one or more light-emitting diodes. Backlight structures 86 may include a light guide plate and other layers 88 (e.g., a diffuser and other optical films). A reflective layer such as reflector 90 may be placed on the rear surface of the light guide plate. As light 94 travels through the light guide plate, some of light 94 scatters upwards in direction Z towards viewer 76 and serves as backlight 66 for display 14. Light that scatters downwards may be reflected upwards by reflector 90 to serve as additional backlight 66.

Display layers 81 may include thin-film transistors such as transistor 52 of FIG. 6 and conductive structures (e.g., electrodes such as electrode 62, gate lines, data lines, and other lines and conductive structures formed from metal and/or indium tin oxide or other transparent conductive materials). Display layers 81 may also include color filter structures for imparting colors such as red, blue, and green colors to pixels 40 in pixel array 34. The color filter structures may be formed in an array (e.g., an array of alternating red, green, and blue color filter elements) and are therefore sometimes referred to as a color filter array or color filter array structures.

Color filter array structures may be formed using colored substances such as dye or pigment (e.g., colored red, blue, and green ink or materials of other suitable colors). Color filter structures may be formed by ink-jet printing, screen printing, pad printing, photolithographic patterning, or other suitable deposition and patterning techniques. Color filter structures may be formed on the same substrate as the thin-film transistors and conductive structures of display pixels 40 or may be formed separately (e.g., on a color filter layer that is separated from a thin-film transistor substrate layer).

Figure 13:
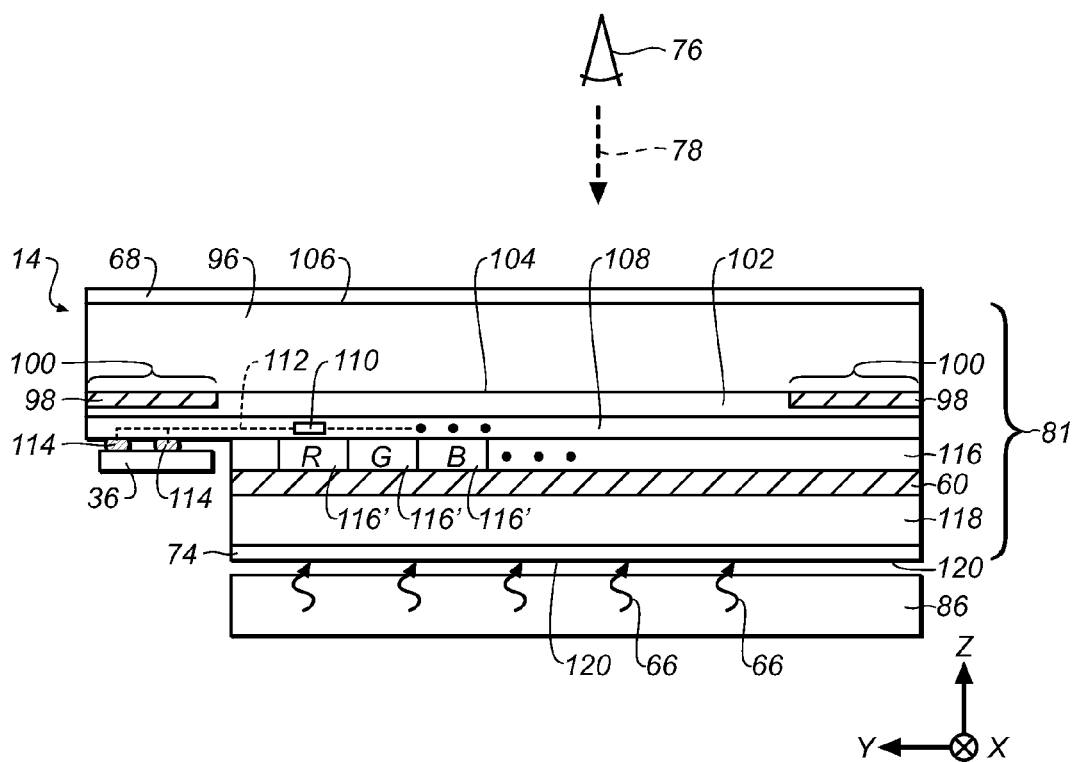
FIG. 13 is a cross-sectional view of an illustrative display having a substrate layer on which thin-film transistor structures and color filter structures have been formed in accordance with an embodiment of the present invention.

FIG. 13 is a cross-sectional view of an illustrative configuration that may be used for display 14 in which color filter elements for the color filter array in display 14 have been formed on the same substrate as the thin-film transistors and conductive structures of display pixels 40. As shown in FIG. 13, display 14 may be provided with backlight 66 using backlight structures 86. During operation, backlight 66 may travel vertically upwards (outwards in dimension Z) through display layers 81 of display 14 to be viewed by a user such as viewer 76 looking at display 14 in direction 78.

Display layers 81 may include a substrate such as substrate 96. Substrate 96 may be formed from glass, plastic, ceramic, or other suitable transparent materials. Substrate 96 may have a rectangular outline or other suitable shape. The surfaces of substrate 96 such as outer (upper) surface 106 and inner (lower) surface 104 may be planar (as shown in FIG. 13) or may be curved.

An opaque (e.g., black) masking material such as an inorganic opaque material (e.g., chrome) or an organic opaque material (e.g., black ink or black plastic) may be used to form peripheral border mask 98 in peripheral border region 100 (e.g., a rectangular ring surrounding a central rectangular active area of display 14). Opaque masking material may also be used to form an opaque matrix (e.g., a black matrix) that separates individual pixels 40. As shown in FIG. 13, masking material 98 may be formed on interior surface 104 of substrate 96 in peripheral border region 100 (as an example).

An optional planarization layer such as layer 102 may be formed over the inner surface of substrate 96 following formation of opaque masking material 98 (e.g., layer 102 may be deposited so as to cover masking material 98). Planarization layer 102 may be formed from a layer of silicon oxide, silicon nitride, silicon oxynitride, an organic material such as acrylic, other transparent planarizing materials, or a combination of two or more of these materials. Layer 102 may be deposited by screen printing, spin-on coating, spray coating, physical vapor deposition, chemical vapor deposition, or other suitable deposition techniques. If desired, layer 102 may be polished to help planarize layer 102.

Layer 108 may be formed on planarization layer 102. Layer 108, which may sometimes be referred to as a thin-film transistor layer, may include display pixel structures such as structures 110 and conductive structures such as traces 112. Structures 110 may include thin-film transistors such as thin-film transistor 52 of FIG. 6 and electrodes such as electrode structures 62 of FIG. 6. Traces 112 may include gate lines 44, data lines 42, and other conductive lines. Structures 110 and 112 may be formed from thin-film transistor materials (e.g., polysilicon or amorphous silicon), conductive materials such as metal and transparent conductors such as indium tin oxide, or other suitable materials.

Solder connections such as solder bumps 114 may be used in connecting display driver integrated circuit 36 or other external circuitry to traces 112 in thin-film transistor layer 108. Integrated circuit 36 may be mounted on substrate 96 so that integrated circuit 36 is fully or partly covered by overlapping portions of masking material 98 (i.e., so that integrated circuit 36 is blocked from view by viewer 76 by overlapping masking layer 98).

Color filter layer 116 may be formed on layer 108. Color filter layer 116 may, for example, be deposited on layer 108 using physical vapor deposition, chemical vapor deposition, ink-jet printing, spraying, pad printing, screen printing, spin-on coating, or other deposition techniques. Color filter layer 116 may include an array of color filter elements 116' each of which may be associated with a different respective display pixel 40 in pixel array 34. Three elements 116' (labeled as red R, green G, and blue B) are shown in FIG. 13. In general, color filter array layer 116 may include any suitable number of pixels (e.g., hundreds or more, thousands or more, tens of thousands or more, etc.). Layers 116 and 108 may have any suitable thicknesses. For example, layers 116 and 108 may each be less than 20 microns thick, less than 10 microns thick, or less than 4 microns thick (as examples).

Liquid crystal layer 60 may be sandwiched between substrate 96 (and the structures formed on lower surface 104 of substrate 96 such as thin-film transistor layer 108 and color filter layer 116) and inner display layers such as inner display layer 118. Layer 118 may be formed from a material such as glass, ceramic, plastic, or other substance that is sufficiently transparent to allow backlight 66 to pass through the display pixels of display layers 81. Layer 118 may, for example, be formed from a rectangular sheet of clear glass or plastic (as an example). As described in connection with FIG. 7, the upper surface of display 14 such as surface 106 of substrate 96 may be covered with an upper polarizer layer such as upper polarizer 68 and may (as described in connection with FIGS. 9 and 11) be covered with an optional display cover layer such as display cover layer 84 and/or coatings such as smudge-resistance coatings, scratch-resistance coatings, and antireflection coatings. The lower surface of display 14 in FIG. 13 (e.g., lower surface 120 of layer 118) may be covered with a lower polarizer layer such as layer 74.

Figure 14:
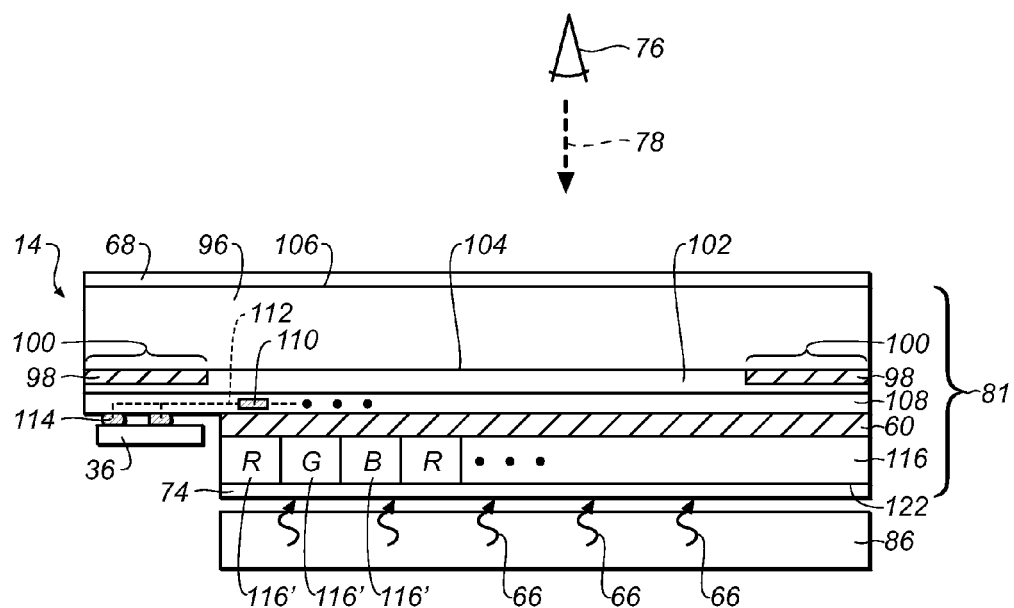
FIG. 14 is a cross-sectional side view of an illustrative display having an upper layer on which thin-film transistor structures have been formed and having a lower layer that serves as a color filter in accordance with an embodiment of the present invention.

FIG. 14 is a cross-sectional view of display 14 in a configuration in which color filter layer 116 has been implemented using a substrate layer that is separate from thin-film transistor substrate layer 96. In this configuration, liquid crystal material 60 may be interposed between thin-film transistor layer 108 and color filter array layer 116. As with display 14 of FIG. 13, display 14 of FIG. 14 may be provided with backlight 66 using backlight structures 86. Backlight 66 may travel vertically upwards (outwards) in dimension Z through display layers 81 of display 14 to be viewed by a user such as viewer 76 looking at display 14 in direction 78.

Display layers 81 may include a substrate such as substrate 96. As with substrate 96 of FIG. 13, substrate 96 of FIG. 14 may be formed from glass, plastic, ceramic, or other suitable transparent materials. Substrate 96 may have a rectangular outline or other suitable shape. The surfaces of substrate 96 such as outer (upper) surface 106 and inner (lower) surface 104 may be planar (as shown in FIG. 14) or may be curved.

An opaque masking material such as an inorganic opaque material (e.g., chrome) or an organic opaque material (e.g., black ink or black plastic) may be used to form peripheral border mask 98 in peripheral border region 100. Opaque masking material may also be used to form an opaque matrix that separates individual pixels 40. Black masking material 98 may be formed on interior surface 104 of substrate 96 (as an example).

An optional planarization layer such as layer 102 may be formed over the inner surface of substrate 96 following formation of opaque masking material 98. Planarization layer 102 may be formed from a layer of silicon oxide, silicon nitride, silicon oxynitride, an organic material such as acrylic, other transparent planarizing materials, or a combination of two or more of these materials. Layer 102 may be deposited over masking material 98 and other features on substrate 96 using screen printing, spin-on coating, spray coating, physical vapor deposition, chemical vapor deposition, or other suitable deposition techniques. If desired, layer 102 may be polished to help planarize layer 102.

Layer 108 may be formed on planarization layer 102. Layer 108, which may sometimes be referred to as a thin-film transistor layer, may include display pixel structures such as structures 110 and conductive structures such as traces 112. Structures 110 may include thin-film transistors such as thin-film transistor 52 of FIG. 6 and electrodes such as electrode structures 62 of FIG. 6. Traces 112 may include gate lines 44, data lines 42, and other conductive lines. Structures 110 and 112 may be formed from thin-film transistor materials (e.g., polysilicon or amorphous silicon), conductive materials such as metal and transparent conductors such as indium tin oxide, or other suitable materials.

Solder connections such as solder bumps 114 may be used in connecting display driver integrated circuit 36 or other external circuitry to traces 112 in thin-film transistor layer 108. Display driver integrated circuit 36 may be mounted under masking layer 98 so that masking layer 98 blocks integrated circuit 36 from view by viewer 76.

Color filter array 116 may be formed from a substrate that is separated from layer 108 by an interposed layer of liquid crystal material such as liquid crystal layer 60. Color filter array 116 may, for example, be formed from an array of color filter elements that are deposited on a substrate such as a layer of glass, plastic, ceramic, or other transparent sheet of material using physical vapor deposition, chemical vapor deposition, ink-jet printing, spraying, pad printing, screen printing, spin-on coating, or other deposition techniques.

Color filter layer 116 of FIG. 14 may include an array of color filter elements 116' each of which may be associated with a different respective display pixel 40 in pixel array 34. Illustrative elements 116' (labeled as red R, green G, and blue B) are shown in FIG. 14. In general, color filter array layer 116 may include any suitable number of color filter elements 116' corresponding to any suitable number of respective display pixels 40 (e.g., hundreds or more, thousands or more, tens of thousands or more, etc.).

As shown in FIG. 14, liquid crystal layer 60 may be sandwiched between upper display layers such as substrate 96 (and the structures formed on lower surface 104 of substrate 96 such as thin-film transistor layer 108) and lower display layers such as color filter array 116. A substrate layer in color filter array 116 may be formed from a material such as glass, ceramic, plastic, or other substance that is sufficiently transparent to allow backlight 66 to pass through the display pixels of display layers 81. Layer 116 may, for example, be formed from a rectangular sheet of clear glass or plastic (as an example). The upper surface of display 14 such as surface 106 of thin-film transistor substrate 96 may be covered with an upper polarizer layer such as upper polarizer 68 and may be covered with an optional display cover layer such as display cover layer 84 and/or coatings such as smudge-resistance coatings, scratch-resistance coatings, and antireflection coatings. The lower surface of display 14 in FIG. 14 (e.g., lower surface 122 of color filter array 116) may be covered with a lower polarizer layer such as layer 74.

Figure 15:
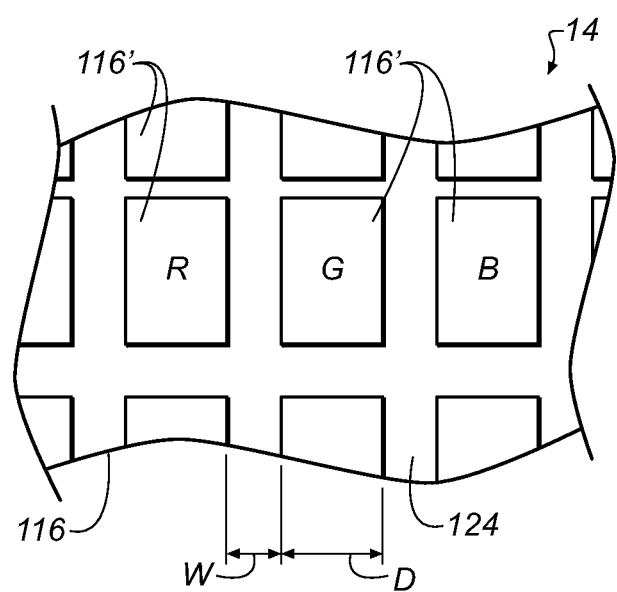
FIG. 15 is a top view of a portion of a display showing how a black matrix may be used to separate color filter elements in accordance with an embodiment of the present invention.

Color filter elements 116' in color filter array 116 may be separated by lines of opaque material (sometimes referred to as black matrix material or opaque masking material). The black matrix may be used to block metal lines and other structures from view by the user of device 10 and may help reduce light leakage between adjacent pixels. The black matrix may be formed from opaque organic or inorganic materials such as chrome and black ink (as examples). The top view of color filter array 116 in FIG. 15 shows how black matrix 124 may form a grid of opaque masking lines laterally interposed between respective color filter elements 116'. The width of the masking lines (shown as width W in FIG. 15) may be less than 50 microns, less than 30 microns, less than 20 microns, less than 15 microns, less than 10 microns, less than 7 microns, less than 3 microns, or any other suitable width. The lateral dimensions of color filter elements 116' may be 500 microns or less, 100 microns or less, 50 microns or less, or 25 microns or less (as examples). For example, rectangular color filter elements 116' in array 116 may be provided with pixel dimensions of 25 microns by 75 microns (as an example).

It may be desirable to reduce the magnitude of black matrix line width W relative to the lateral dimensions D of color filter elements 116' to improve display brightness (i.e., brightness efficiency). Using arrangements of the type shown in FIG. 13 in which a layer of color filter elements 116' has been deposited on thin-film transistor layer 108, color filter array layer 116 may be formed in close proximity to the thin-film transistors, electrodes, and other structures of thin-film transistor layer 108. This may facilitate accurate alignment between the black matrix in the color filter array and underlying structures in layer 108, thereby allowing the magnitude of black matrix line width W to be minimized.

Figure 16:
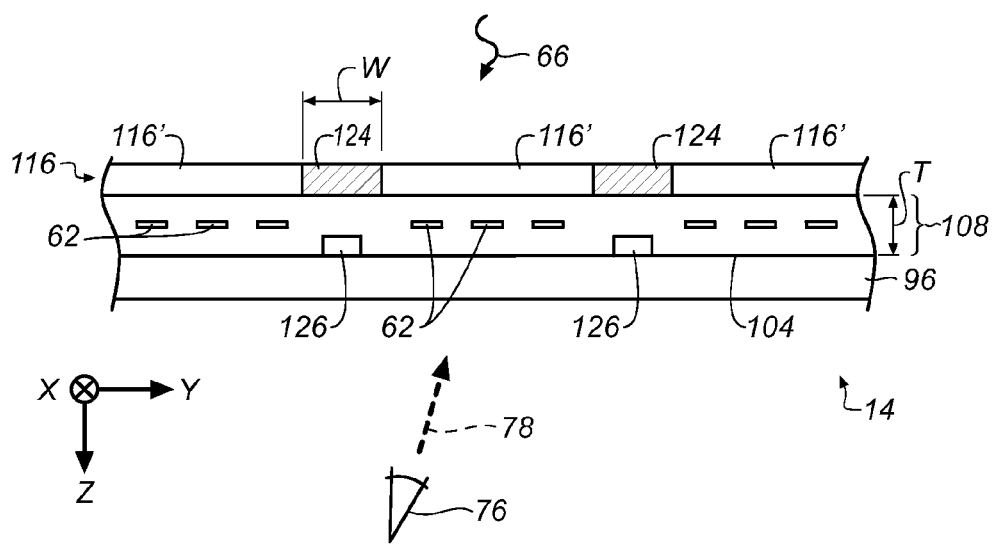
FIG. 16 is a cross-sectional side view of a portion of a display showing how black matrix structures in the display may be used to cover underlying structures such as conductive lines on a thin-film transistor substrate in accordance with an embodiment of the present invention.

As shown in FIG. 16, thin-film transistor layer 108 may be formed on substrate 96. Each electrode 62 (i.e., each set of three common electrode finger structures in the example of FIG. 16) may be configured to overlap with a corresponding color filter element 116'. Color filter elements 116' may be used to impart colors to backlight 66 before backlight 66 passes through the pixels of thin-film transistor layer 108 and is viewed in direction 78 by viewer 76. Lines of black matrix material 124 may be configured to overlap structures in thin-film transistor layer 108 such as structures 126 (e.g., gate lines 44, data lines 42, etc.) and thereby block structures 126 from view. The thickness T of thin-film transistor layer 108 and therefore the vertical separation in dimension Z between color filter layer 116 and the thin-film structures on surface 104 of substrate 96 may be relatively small (e.g., less than 25 microns, less than 5 microns, less than 2 microns, etc.). The small thickness T and the ability to form color filter layer 116 on layer 108 allows black matrix lines 124 to be accurately aligned with respect to structures 126. This accurate alignment allows the size W of black matrix lines 124 to be minimized (e.g., so be less than 50 microns, less than 30 microns, less than 20 microns, less than 15 microns, less than 10 microns, less than 7 microns, less than 3 microns, or other suitable width). By minimizing W relative to the lateral dimensions (e.g., dimension D) of color filter elements 116', display brightness (e.g., the efficiency with which display 14 transmits a given amount of backlight 66) may be enhanced.

Figure 17:
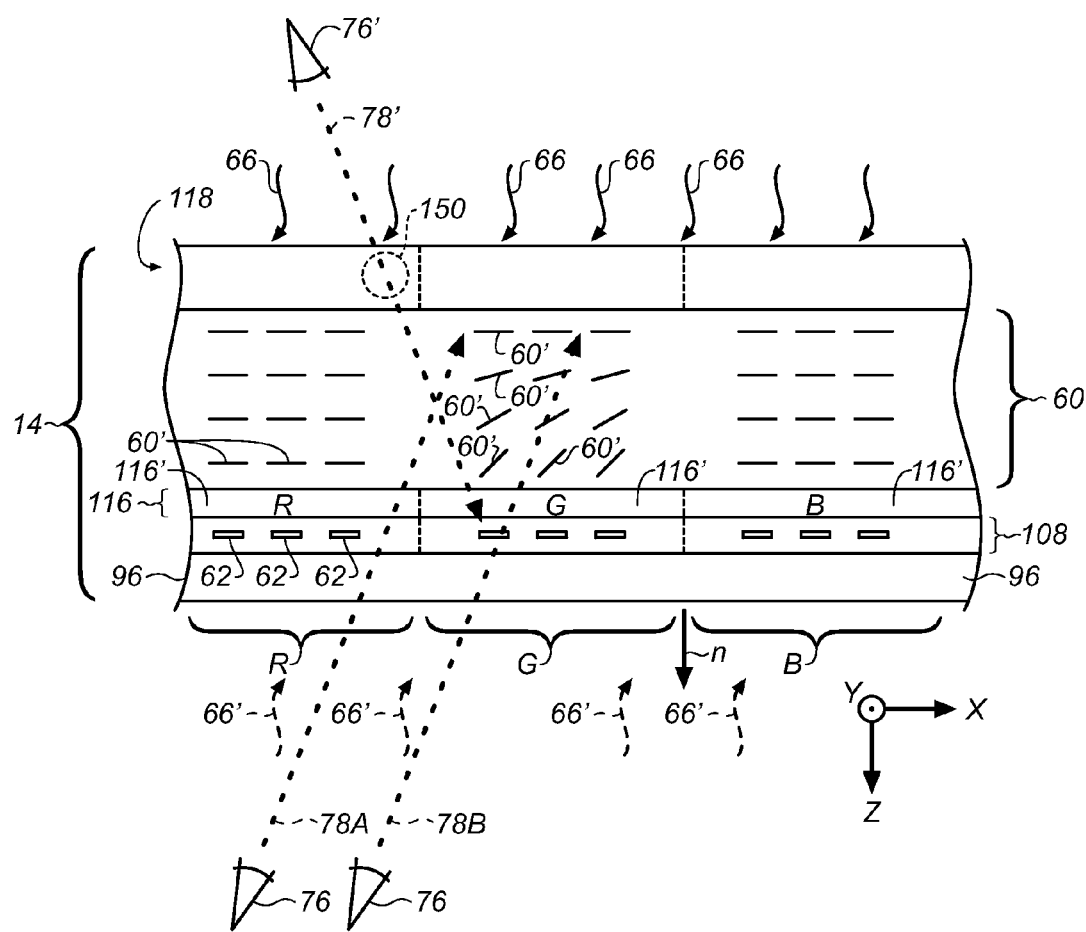
FIG. 17 is a cross-sectional side view of an illustrative display showing how formation of a layer of color filter elements on top of underlying thin-film structures such as electrode structures on a thin-film-transistor substrate may help improve off-axis display performance in accordance with an embodiment of the present invention.

Configuring display 14 so that viewer 76 views display pixels 40 through thin-film transistor substrate 96 and electrodes 62 rather than color filter 116 may reduce light leakage effects between adjacent pixels. Consider, as an example, display 14 of FIG. 17. As shown in FIG. 17, viewer 76 may view display 14 through substrate 96 and thin-film transistor layer 108 by viewing in directions such as direction 78A and 78B. (Polarizer layers, cover glass, backlight structures and other layers have been omitted from FIG. 17 for clarity). Backlight 66 passes through liquid crystal material 60. Electrodes 62 are located in thin-film transistor layer 108 on substrate 96, so the electric field that is produced in liquid crystal material 60 is strongest near layer 108 and is weakest near layer 118. Color filter array 116 and color filter elements 116' may be deposited on thin-film transistor layer 108. Layer 118 may be formed from clear glass, clear plastic, or other transparent material.

The gradual weakening of the electric field strength in layer 60 with increasing distance from layer 108 is illustrated for the green "G" pixel in FIG. 17. In the FIG. 17 example, the red pixel "R" and the blue pixels "B" are not receiving signals on their respective electrodes 62, so the liquid crystals 60' in the portions of liquid crystal layer 60 that are associated with the R and B pixels has not been rotated, as illustrated in FIG. 17. The electrode 62 that is associated with the green ("G") pixel is, however, receiving a signal (in this example) and is therefore producing an electric field in an adjacent portion of layer 60. As a result, liquid crystals 60' above electrode 62 in the green ("G") pixel are rotated. Because the electric field strength in the green pixel decreases with increasing distance into layer 60 away from thin-film layer 108 and electrode 62, the amount of rotation of liquid crystals 60' in the green pixel decreases by a corresponding amount at increasing distances into layer 60 away from layer 108, as shown in FIG. 17.

When viewing the pixels of display 40 "on axis" (i.e., along a direction that is parallel to the surface normal n for substrate 96), backlight 66 will generally not leak appreciably into adjacent pixels and the pixel colors will tend not to bleed into each other. When, however, viewer 76 views display 14 along an off-axis angle such as the angle associated with directions 78A and 78B of FIG. 17, there is a risk that the viewer will view part of the liquid crystal material associated with one pixel through the color filter of another pixel. If not well controlled, this effect can reduce display performance by reducing color accuracy.

With a display of the type show in FIG. 17, off-axis performance may be enhanced, because off-axis light rays that have the potential to cause interference have relatively low intensities. When viewer 76 views light 66 traveling along viewing axis 78B, viewer 76 will observe light 66 that has travelled through strongly rotated (i.e., strongly "on") liquid crystals 60' and a corresponding portion of the green ("G") color filter element 116' in color filter layer 116. The viewer observing the center of the green pixel along axis 78B will therefore correctly observe that the green pixel is emitting green backlight 66 and has a green color. When viewer 76 views light 66 traveling along viewing axis 78A, however, viewer 76 will observe light 66 that has travelled through a weakly rotated (i.e., weakly "on") liquid crystals 60' and a corresponding portion of the red ("R") color filter element 116' in color filter layer 116. The red pixel in the FIG. 17 example has been turned "off" (i.e., the red pixel's liquid crystals 60' have not been rotated), so the viewer should not be observing any red light through the red color filter element 116'. The red light 66 that the viewer observes along axis 78A therefore represents a source of color error and tends to degrade display performance. Nevertheless, because the liquid crystals 60' through which the red light traveling along axis 78A has passed are weakly rotated, the magnitude (intensity) of the erroneous red light that is observed by viewer 76 will tend to be small. The reduced tendency for display 14 to exhibit color bleeding between adjacent pixels may be exploited to enhance color accuracy and/or to reduce the width of black matrix 124 and thereby improve display brightness efficiency.

In conventional displays, there is more potential for color interference between adjacent pixels. Consider, as an example, a situation in which layer 118 of FIG. 17 is used to implement a conventional color filter array and color filter layer 116 is omitted. Conventional backlight 66' in this scenario would pass through strongly rotated liquid crystals 60' in the green pixel before passing through red color filter element portion 150 of layer 118 along axis 78'. Off-axis viewer 76' of the conventional display would therefore observe a significant erroneous red light component when the green pixel is turned on.

The foregoing is merely illustrative of the principles of this invention and various modifications can be made by those skilled in the art without departing from the scope and spirit of the invention.

What is claimed is:

1. A display having an active area surrounded by a peripheral border region, the display comprising:
  an outer display layer comprising:
    a substrate having first and second opposing surfaces;

an opaque masking layer formed on the substrate only in the peripheral border region of the display such that the substrate is free of the opaque masking layer in the active area;

a thin-film transistor layer formed on the substrate, the thin-film transistor layer including one or more thin-film transistors and one or more electrode structures, wherein the one or more thin-film transistors are associated with one or more display pixel structures; and a planarization layer formed on the substrate, wherein at least a portion of the opaque masking layer is interposed between the planarization layer and the substrate such that the planarization layer forms a planar surface on which the thin-film transistor layer is formed;

an inner display layer comprising:

a color filter layer including one or more color filter elements and an opaque masking material that separates a first one of the one or more color filter elements from a second one of the one or more color filter elements;

a layer of liquid crystal material between the outer display layer and the inner display layer; and backlight structures, wherein the inner display layer is interposed between the layer of liquid crystal material and the backlight structures.

2. The display defined in claim 1 wherein the inner display layer comprises a layer of clear material selected from the group consisting of: clear glass and clear plastic.

3. The display defined in claim 2 wherein the thin-film transistors are formed on an inner surface of the substrate and wherein the thin-film transistors are interposed between the color filter layer and the substrate.

4. The display defined in claim 3 wherein the substrate comprises a layer of glass.

5. The display defined in claim 4 wherein the planarization layer is interposed between the substrate and the thin-film transistors.

6. The display defined in claim 4 further comprising a display driver integrated circuit mounted on the substrate, wherein at least some of the opaque masking layer overlaps the display driver integrated circuit.

7. The display defined in claim 6 wherein the opaque masking layer hides the display driver integrated circuit from view.

8. The display defined in claim 1 wherein the outer display layer comprises a peripheral border region that extends laterally beyond the inner display layer and the backlight structures, and wherein the display further comprises a display driver integrated circuit mounted to the outer display layer in the peripheral border region.

9. The display defined in claim 1 wherein the opaque masking layer comprises an organic material and wherein the planarization layer comprises a spin-on coating on the organic material.

10. A display having an active area and an inactive area, the display comprising:

an outer display layer having a first substrate, wherein the first substrate comprises a thin-film transistor layer having one or more electrode structures and one or more thin-film transistors formed thereon;

an inner display layer having a second substrate, wherein a color filter layer comprising a plurality of color filter elements and an opaque material that separates first and second color filter elements in the plurality of color filter elements are formed on the second substrate;

a layer of liquid crystal material between the outer display layer and the inner display layer;

backlight structures, wherein the inner display layer is interposed between the layer of liquid crystal material and the backlight structures; and an opaque masking material formed directly on a peripheral portion of the first substrate in the inactive area of the display, wherein the opaque masking material does not extend into the active area of the display.

11. The display defined in claim 10 wherein the outer display layer comprises a layer of clear material selected from the group consisting of: clear glass and clear plastic.

12. The display defined in claim 10 wherein the outer display layer comprises a layer of glass.

13. The display defined in claim 12 further comprising a planarizing layer that covers the opaque masking material, wherein the planarizing layer is interposed between the layer of glass and the thin-film transistors.

14. The display defined in claim 12 further comprising a display driver integrated circuit mounted on the layer of glass, wherein at least some of the opaque masking material overlaps the display driver integrated circuit.

15. The display defined in claim 14 wherein the display driver integrated circuit is mounted on an edge of the layer of glass that does not overlap the backlight structures.

16. The display defined in claim 10 wherein the one or more electrode structures comprise one or more gate lines and one or more data lines.

17. An electronic device, comprising:

a housing having sidewalls with uppermost edges; and a display mounted in the housing such that at least a portion of the display extends over the uppermost edges of the sidewalls, wherein the display comprises:

a substrate having an upper surface and a lower surface;

a thin-film transistor layer that is formed on the lower surface of the substrate, wherein the thin-film transistor layer comprises thin-film transistors, one or more electrode structures, and associated display pixel structures in an active area of the display;

backlight structures configured to produce backlight for the display, wherein the lower surface of the substrate is interposed between the upper surface of the substrate and the backlight structures;

color filter elements that are interposed between the thin-film transistors and the backlight structures, wherein each of the color filter elements are separated by an opaque material; and an opaque masking material in a peripheral border region of the display that surrounds the active area, wherein the opaque masking material is interposed between the lower surface of the substrate and the thin-film transistor layer and does not overlap the active area of the display.

18. The electronic device defined in claim 17 further comprising a display driver integrated circuit mounted on the substrate, wherein the opaque masking material overlaps the display driver integrated circuit and blocks the display driver integrated circuit from view through the substrate.

19. The electronic device defined in claim 18 further comprising a planarizing layer that covers the opaque masking material and that is interposed between the substrate and the thin-film transistors.

20. The electronic device defined in claim 17 wherein the thin-film transistor layer has an upper surface and a lower surface and wherein the lower surface of the thin-film transistor layer is interposed between the upper surface of the thin-film transistor layer and the backlight structures; and a display driver integrated circuit mounted on the lower surface of the thin-film transistor layer.

* * * * *